Feb. 4, 1941. C. L. CLAFF Re. 21,706

METHOD OF MAKING PAPER BOXES OR THE LIKE WITH PRINTED WRAPPERS

Original Filed Feb. 4, 1938 6 Sheets-Sheet 1

C. L. Claff

INVENTOR.

BY C. A. Snow & Co.

ATTORNEYS.

Feb. 4, 1941. C. L. CLAFF Re. 21,706

METHOD OF MAKING PAPER BOXES OR THE LIKE WITH PRINTED WRAPPERS

Original Filed Feb. 4, 1938 6 Sheets-Sheet 2

C. L. Claff

INVENTOR.

BY C. A. Snow & Co.

ATTORNEYS.

METHOD OF MAKING PAPER BOXES OR THE LIKE WITH PRINTED WRAPPERS

Original Filed Feb. 4, 1938 6 Sheets-Sheet 3

C. L. Claff

INVENTOR.

BY C. A. Snow & Co.

ATTORNEYS.

METHOD OF MAKING PAPER BOXES OR THE LIKE WITH PRINTED WRAPPERS

Original Filed Feb. 4, 1938 6 Sheets-Sheet 4

C. L. Claff

INVENTOR.

BY C. A. Snow & Co.

ATTORNEYS.

Feb. 4, 1941. C. L. CLAFF Re. 21,706

METHOD OF MAKING PAPER BOXES OR THE LIKE WITH PRINTED WRAPPERS

Original Filed Feb. 4, 1938 6 Sheets-Sheet 5

C. L. Claff
INVENTOR.

BY C. A. Snow & Co.
ATTORNEYS.

Feb. 4, 1941. C. L. CLAFF Re. 21,706
METHOD OF MAKING PAPER BOXES OR THE LIKE WITH PRINTED WRAPPERS
Original Filed Feb. 4, 1938 6 Sheets-Sheet 6
Fig. 12.
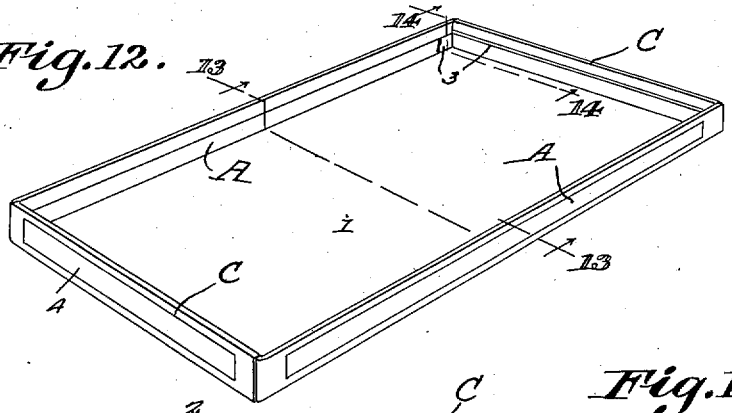
Fig. 13.
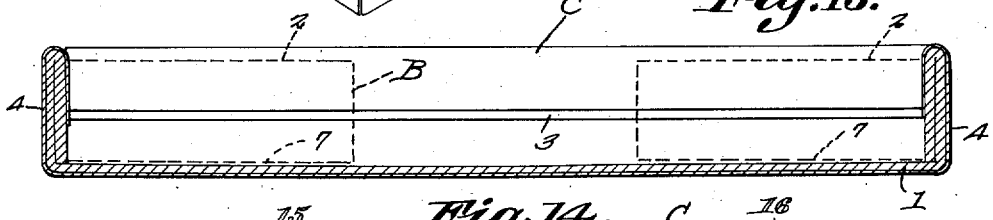
Fig. 14.
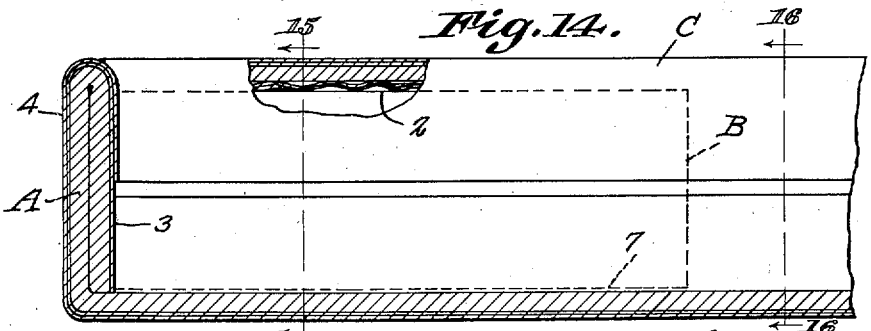
Fig. 16.
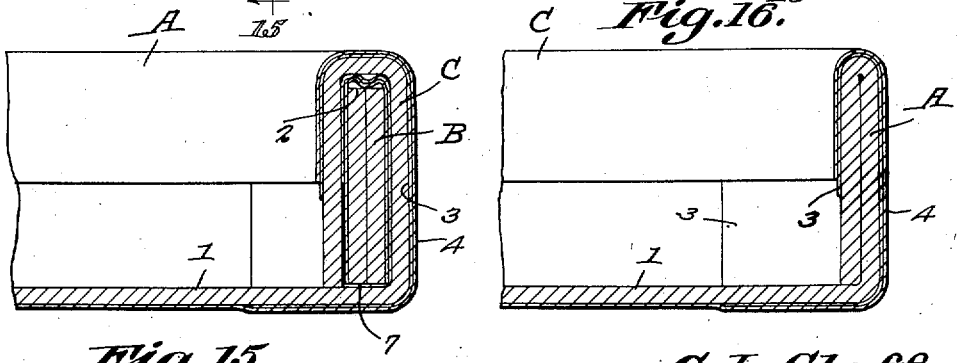
Fig. 15.
C. L. Claff
INVENTOR.
BY C. A. Snow & Co.
ATTORNEYS.

Reissued Feb. 4, 1941

Re. 21,706

UNITED STATES PATENT OFFICE 21,706

METHOD OF MAKING PAPER BOXES OR THE LIKE WITH PRINTED WRAPPERS

Clarence Lloyd Claff, Randolph, Mass., assignor to Norfolk Paper Co., Inc., Randolph, Mass., a corporation of Massachusetts Original No. 2,166,287, dated July 18, 1939, Serial No. 188,766, February 4, 1938. Application for reissue June 7, 1940, Serial No. 339,408

13 Claims. (Cl. 93—36.6)

This invention relates to a new and improved method of making reinforced paper boxes, box lids and the like of the type illustrated and described in the present inventor's prior Patent No. 2,132,776, dated October 11, 1938, with wrappers or covering sheets which may contain printed matter.

Heretofore it has been the practice to apply a web of paper to a cardboard web and thereafter to print the impression on the applied paper web. However, because of the varying thickness of the cardboard web the impressions thus made have not been satisfactory at all times. In order to create a superior package, it has been found desirable to apply a printed wrapper to the box or lid after it has been "set up."

An object of the present invention is to provide a method of applying printed wrappers to a web of cardboard used in the manufacture of boxes or lids of the type shown, for example, in Reissue Patent No. 20,332, issued to me on April 13, 1937, and in my Patent No. 2,132,776 above referred to.

In carrying out the improved method constituting the present invention, the printed wrapper can be applied either before or after the cardboard blank has been severed from the web. The invention consists of certain new and novel steps in the method of producing boxes and lids or the like which will be hereafter more fully described and pointed out in the claims, it being understood that various changes may be made without departing from the spirit of the invention as claimed.

In the accompanying drawings the several steps of the method have been illustrated.

In said drawings

Figure 12 is a perspective view of a box or box lid produced from a blank formed by either of the methods herein described.

Figure 13 is an enlarged section on lines 13—13, Figure 12.

Figure 14 is an enlarged section on line 14—14, Figure 12.

Figure 15 is a section on line 15—15, Figure 14.

Figure 16 is a section on line 16—16, Figure 14.

In carrying out the present method it is preferred to use a cross-grain cardboard web indicated at 1 and as this web passes through a blank forming machine, opposed alining side slots 2 are cut thereinto, four of these slots being provided for each blank to be produced. As illustrated and described in Patent No. 2,132,776 heretofore referred to, these slots align with the points where the cardboard is to be folded over to form the double side walls of the box and thus they represent a removal of material from the upper edges of the end wing portions of the side walls. As the blank continues through the forming process, reinforcing strips, such as kraft tapes 3 are applied to one face of the web so as to extend across slots 2, these tapes being spaced inwardly slightly from the adjacent edges of the web.

Figure 1:
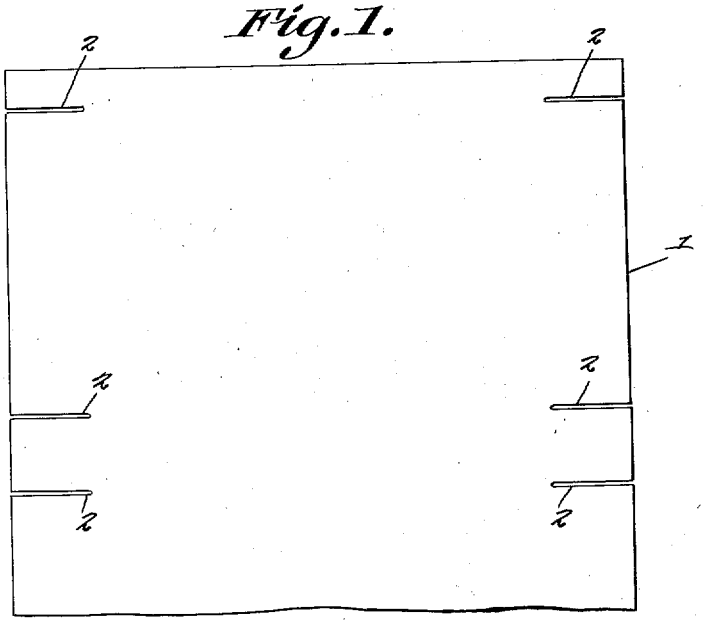
Figure 1 is a plan view of a portion of a web following the first step of the operation which is the formation of the first set of side slots.
Figure 2:
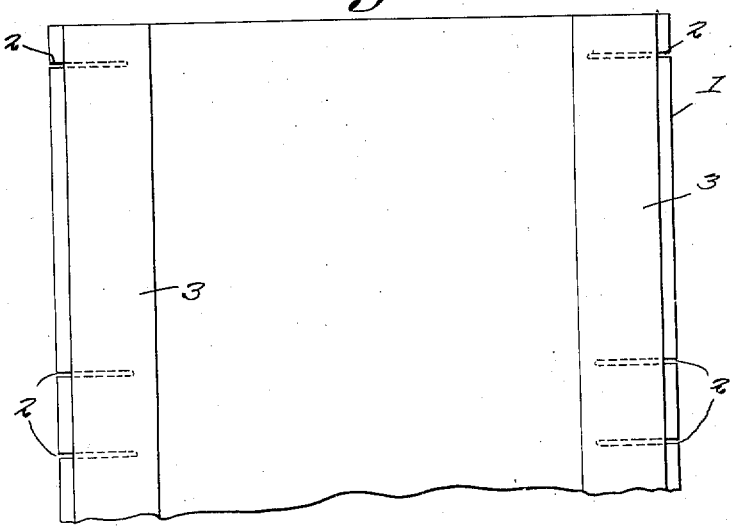
Figure 2 illustrates the second step of the method wherein reinforcing or "kraft" tapes are applied.
Figure 3:
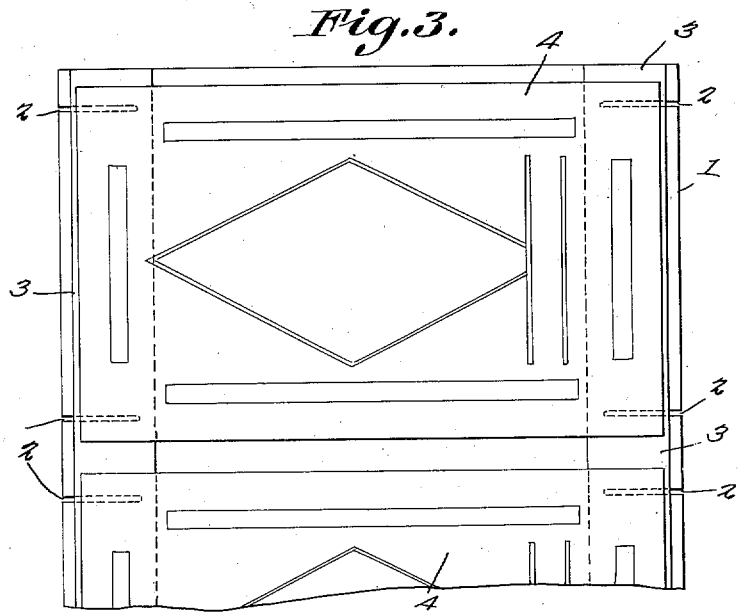
Figure 3 illustrates the third step wherein the printed wrappers are applied in proper position to the slotted web.
Figure 4:
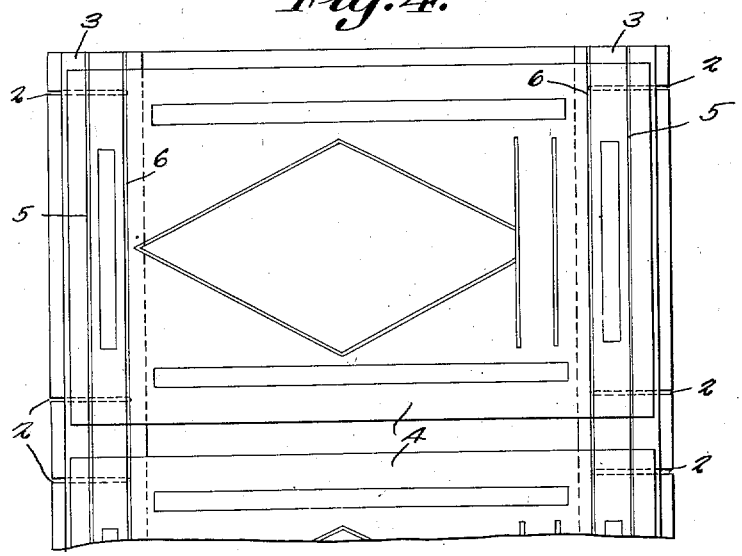
Figure 4 illustrates the fourth step of the method wherein the side portions of the web are scored.
Figure 5:
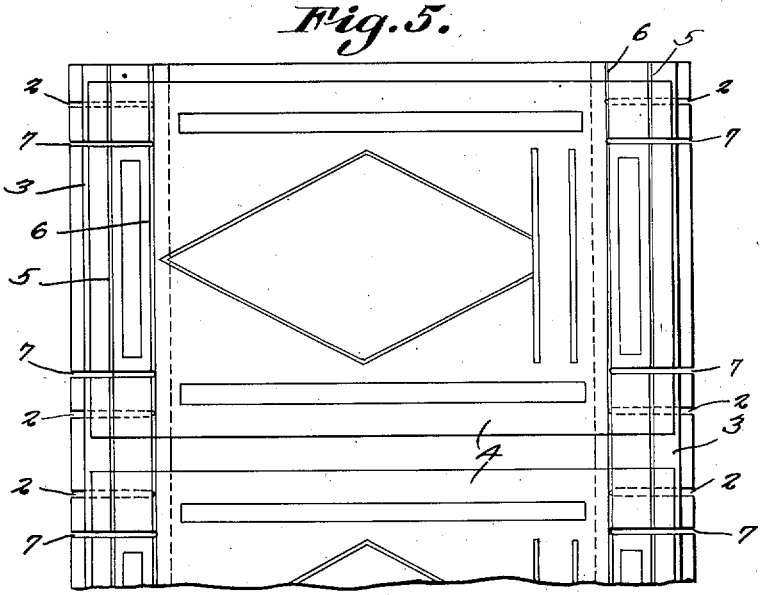
Figure 5 illustrates the fifth step of the method consisting of the formation of supplemental side slots extending through both the wrappers and the web.

The next step in the operation comprises the application of wrapper 4 to the web at the proper points. These wrappers, which had previously been prepared by cutting them to the proper sizes and printing the desired display matter on them, are to be placed one at a time upon the web so that they will be properly spaced, as shown in Figure 3 with the covered slots 2 extending under the corner portions thereof. Thereafter parallel scores 5 and 6 are pressed into the web 1, tapes 3 and wrappers 4, the scores 6 being located at the inner ends of the slots 2 while the scores 5 extend across said slots adjacent to the centers thereof. Following the formation of these scores as in Figure 4, supplemental slots 7 are cut through the wrapper 4, tapes 3 and web 1 at points between and parallel with the slots 2 and, following this step, illustrated in Figure 5, transverse scores 8 and 9 are pressed into the web and wrapper, the scores 8 being in line with the opposed slots 2 while the scores 9 are in line with the opposed slots 7.

Figure 6:
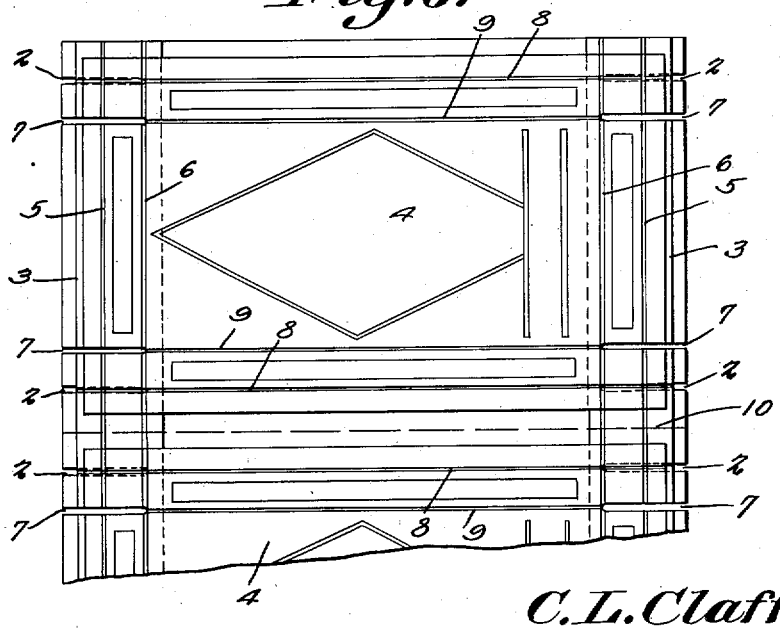
Figure 6 illustrates the next step wherein transverse scores are formed which connect the opposed slots in the web.

Following the foregoing operation the web is severed transversely between the wrappers 4 along the line 10 in Figure 6, thereby to produce a finished blank ready to be shaped into a box or a lid such as shown, for example, in Figures 12 to 16 inclusive.

Figure 7:
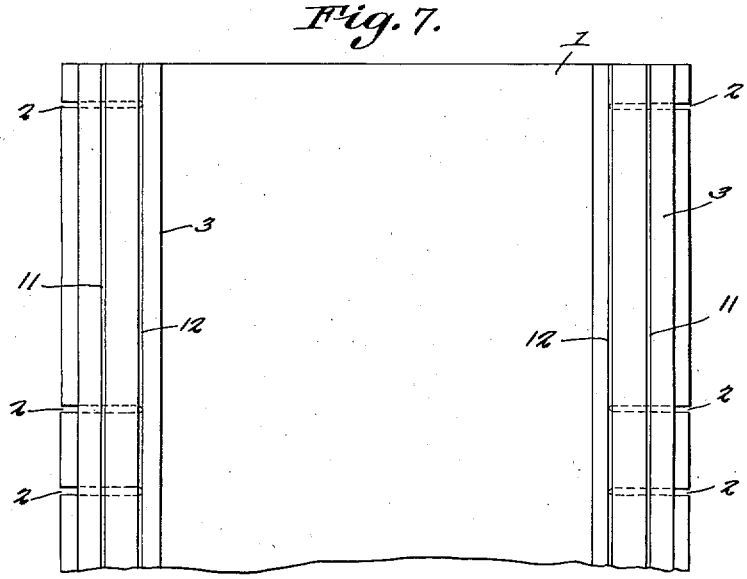
Figure 7 is a view of a blank wherein, following the step shown in Figure 2, the side scores are formed in the reinforced blank before the wrapper is applied.
Figure 8:
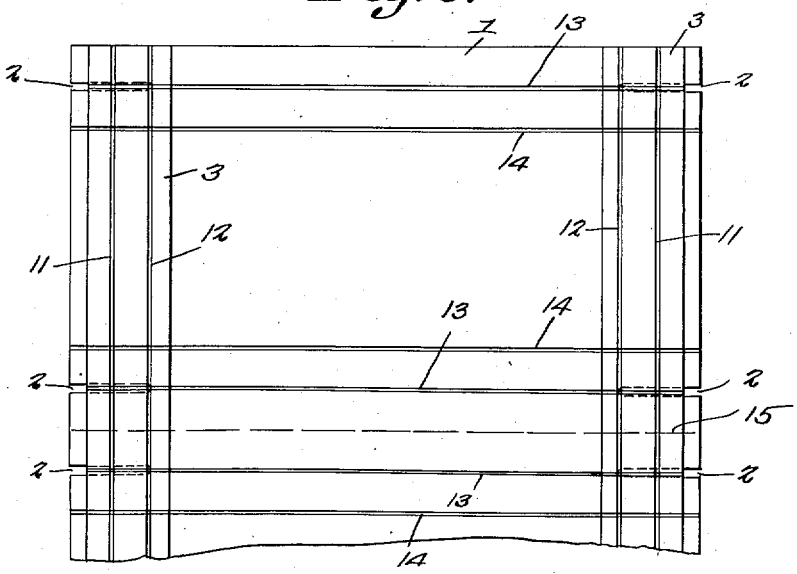
Figure 8 illustrates the next step in this modified method wherein the transverse scores are formed in the reinforced web.
Figure 9:
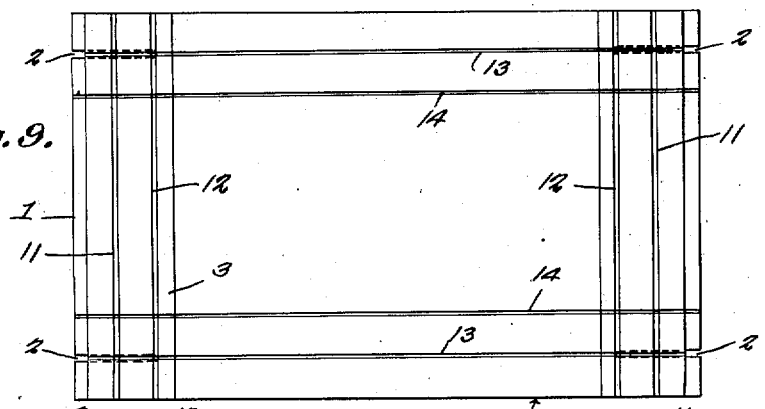
Figure 9 shows the blank severed from the web.
Figure 10:
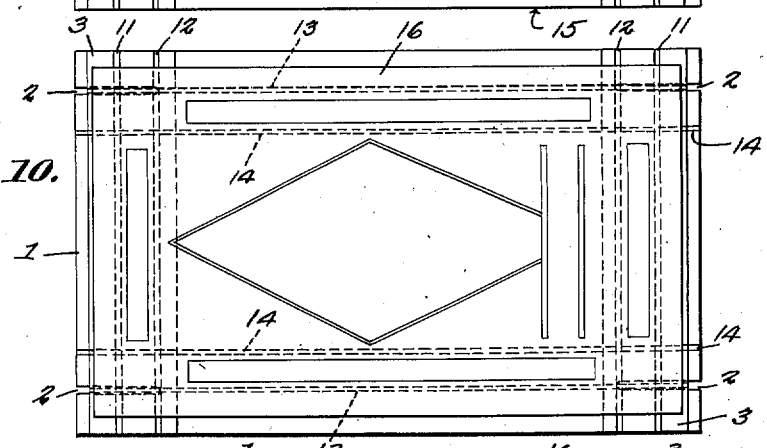
Figure 10 shows the same blank with the wrapper applied thereto.
Figure 11:
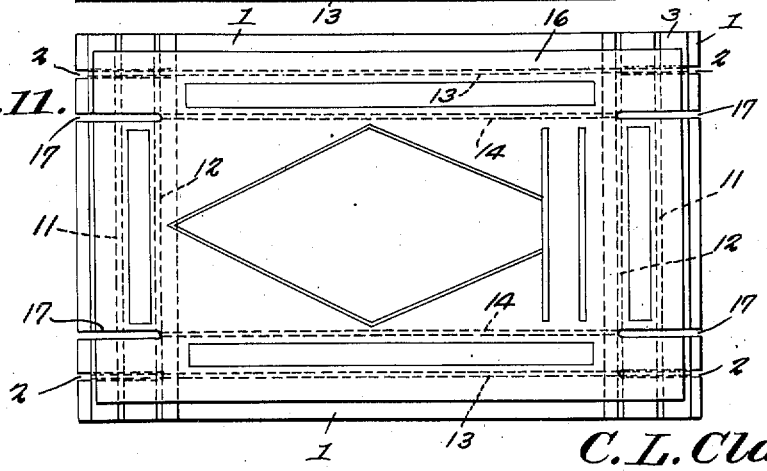
Figure 11 shows the next operation of producing supplemental side slots in the blank and wrapper.

As a modification of the method already explained, the web 1 with the slots 2 in the sides thereof and with the reinforcing kraft tape applied to the web and bridging the slots, can be scored longitudinally to produce scores 11 and 12 located as in Figure 7 and thereafter transverse scores 13 and 14 can be formed in the web, these being located as at 8 and 9 in Figure 6. The web is then severed transversely along the line 15 to form separate blanks one of which has been shown in Figure 9 and following the formation of this blank, a printed wrapper of proper size and shape is affixed to the blank as shown at 16 in Figure 10 and the entire blank then cut to form the supplemental slots 17 corresponding with slots 7 heretofore described. Thus the completed blank is the same as the one which was produced by severing a blank from the web along line 10 in Figure 6.

Following the formation of a blank by either method herein described, those portions of the blank defined by the scores 8 and 9 or 13 and 14 are folded to form side walls of double thickness while those portions of the blank defined by the slots 2 and 7 or 2 and 17 will thus constitute wings of double thicknesses which, as shown in Figures 13, 14 and 15, are turned toward each other and adapted to be straddled by the end folds defined by the scores 5 and 6 or 11 and 12. By reason of the removal of the material effected by cutting the first set of slots prior to the application of the tapes and wrapper, the end folds are not forced above the edge of the side walls, but instead, as illustrated in Figures 13 and 16 of the present application and in Figures 4–8 of Patent No. 2,132,776 and as particularly described on page 2 of said patent, column 2, lines 1–21, the unsevered reenforcing tapes 3 and the wrapper 4 are readily crushed down toward the edges 2 of the first slots to permit the top edges of the end folds to lie substantially flush with the side walls while providing effective reenforcement around the corners of the box and across the end folds. In addition the finished box or lid will have a superior appearance because the printed matter appearing on the wrapper was impressed prior to the application of the wrapper to the web, thereby insuring a good impression.

In Figures 12 to 16 inclusive the side wall of the completed box or lid has been indicated at A, the inturned wings at B, and the end folds at C.

It is to be understood that the term "box" used in the claims is to apply to either the body portion of a box or to the lid, and that the word "scored" is to be construed as broad enough to apply either to a score line or a crease.

What is claimed is:

1. The herein described method of producing a paper box with a printed wrapper, which includes the step of printing a wrapper of the desired size and shape, forming opposed aligned slots in a thickness of cardboard, applying reinforcing tapes to said thickness where they will bridge the slots, affixing a printed wrapper to the thickness of cardboard and reinforcing tapes thereon, cutting supplemental slots through the wrapper and cardboard at points adjacent to and parallel with the first mentioned slots, and finally folding the cardboard and wrapper along lines aligning with the opposed slots to produce side walls and wings of double thickness, the remaining edge portions of the cardboard and wrapper constituting end folds straddling the wings.

2. The herein described method of producing a cardboard box with a printed wrapper which includes the step of forming opposed aligning slots in a thickness of cardboard at points where said thickness is to be folded to produce side walls of the box, applying reinforcing tapes to said thickness of cardboard where they will bridge the slots, affixing a printed wrapper to the thickness of cardboard and the tapes thereon, cutting slots through the wrapper, tapes and cardboard at points where they will align with the bases of the folded side walls of the box, subsequently folding the cardboard and wrapper along the lines defined by the slots thereby to produce side walls of double thicknesses and end wings of double thicknesses, and finally folding portions of the cardboard and wrapper over the end wings to constitute end walls of the box.

3. A method of producing a paper box which includes the step of forming opposed aligning slots in the side edge portions of a cross-grain cardboard web, applying reinforcing tapes to one face of the web where they will bridge the slots, thereafter applying a printed wrapper to the web and tapes where it will bridge the slots, subsequently scoring the web, wrapper and tapes transversely of the slots, thereafter forming supplemental aligning transverse slots between and parallel with the first mentioned slots and extending through the web, tapes, and wrapper, thereafter scoring the wrapper, web, and tapes in line with all of the slots, thereafter severing the web between the applied wrapper to produce a blank, and finally setting up the blank to provide a box having folded side walls, inturned end wings, and end folds straddling the wings.

4. The herein described methods of producing a cardboard box having a printed wrapper, which includes the step of forming opposed aligning slots in the side portions of a cross-grain web of cardboard, applying reinforcing tapes to the web where they will bridge the slots, thereafter forming the web with spaced scores adjacent each edge thereof and extending transversely of the slots and longitudinally of the tapes, subsequently providing the web with pairs of transverse scores, one score of each pair being in line with the adjacent slots, thereafter severing the web transversely between the determined slots to produce a blank having a slot adjacent to each corner thereof, subsequently affixing a printed wrapper to the blank where it will bridge the slots, thereafter cutting slots through opposed edge portions of the web, and the wrapper thereon, said slots being parallel with the slots at the end of one score of each pair and in line with the remaining scores of said pairs, and finally folding the blank to produce a box having side walls and end wings of double thickness and end folds straddling the wings.

5. The method of producing a box blank which comprises forming opposed aligned transverse slots in the side edge portions of a web of cardboard, applying reinforcing tapes to the web longitudinally thereof and bridging the slots, severing the web transversely at blank intervals to produce a blank having a slot adjacent each corner thereof, affixing a sheet of cover material to the blank, scoring the blank adjacent each edge longitudinally of the tapes and in pairs transversely thereof, one score of each pair being in line with the adjacent slots, and cutting slots through opposed edge portions of the assembly parallel to the first slots and in line with the other score of each pair of transverse scores.

6. The method of producing a cardboard box having double side walls, inturned end wings, and end folds straddling the end wings, which includes the steps of forming slots in a thickness of cardboard aligned with points where the cardboard is to be folded over to form the double side walls of the box, thereby to reduce the height of the end wings, applying reenforcing tapes to said cardboard where they will bridge the slots to form a continuous reenforcement over the top edges of the end wings, and subjecting the assembly to further operations including cutting through the assembly at points where the end wings are to be separated from the end folds.

7. The method of producing a cardboard box having double side walls, inturned end wings, and end folds straddling the end wings, which includes the steps of forming slots in a thickness of cardboard aligned with points where the cardboard is to be folded over to form the double side walls of the box, thereby to reduce the height of the end wings, applying reenforcing tapes to said cardboard where they will bridge the slots and extend inwardly therefrom to form a continuous reenforcement over the top edges of the end wings and over the folded top edges of the side walls adjacent the end wings, and subjecting the assembly to further operations including cutting through the assembly at points where the end wings are to be separated from the end folds.

8. The method of producing a cardboard box having double side walls, inturned end wings, and end folds straddling the end wings, which includes the steps of forming slots in a web of cardboard aligned with points where the cardboard is to be folded over to form the top edges of the double side walls of the box, thereby to reduce the height of the end wings, applying reenforcing tapes to the web where they will bridge the slots to form a continuous reenforcement over the top edges of the end wings, and subjecting the assembly to further operations including cutting through the assembly at points where the end wings are to be separated from the end folds and severing the assembly from the web.

9. The method of producing a cardboard box having double side walls, inturned end wings, and end folds straddling the end wings, which includes the steps of forming slots in a thickness of cardboard aligned with points where the cardboard is to be folded over to form the double side walls of the box, thereby to reduce the height of the end wings, applying reenforcing tapes to the cardboard where they will bridge the slots to form a continuous reenforcement over the top edges of the end wings, applying cover material to the cardboard and tapes, and cutting supplemental slots through the cardboard, tapes, and cover material at points where the slots will align with the bases of the folded side walls of the box to separate the end wings from the end folds.

10. The method of producing a cardboard box having double side walls, inturned end wings, and end folds straddling the end wings, which includes the steps of forming opposed aligning slots in the side edge portions of a web of cardboard at points where the cardboard is to be folded over to form the double side walls of the box, thereby to reduce the height of the end wings, applying reenforcing tapes to the web over the slots to form a continuous reenforcement over the top edges of the end wings, severing the web transversely at blank intervals, applying a wrapper to the severed blank, and cutting supplemental opposed aligning slots through the web, tapes and wrapper where the slots will align with the bases of the folded side walls of the box to separate the wings from the end folds.

11. The method of producing a cardboard box having double side walls, inturned end wings, and end folds straddling the end wings, which includes the steps of forming opposed aligning slots inwardly of the side edge portions of a web of cardboard at points where the cardboard is to be folded over to form the double side walls of the box, thereby to reduce the height of the end wings, applying reenforcing tapes to one face of the web where they will bridge the slots to form a continuous reenforcement over the top edges of the end wings, applying cover material to the web and tapes, cutting supplemental aligning slots inwardly of the edges of the assembly through the cardboard, tapes, and cover material at points where the slots will align with the bases of the folded side walls of the box to separate the end wings from the end folds, and severing the assembly at blank intervals.

12. The method of producing a cardboard box having double side walls, inturned end wings, and end folds straddling the end wings, which includes the steps of forming opposed aligning slots inwardly of the side edge portions of a web of cardboard at points where the cardboard is to be folded over to form the top edges of the double side walls of the box, thereby to reduce the height of the end wings, applying reenforcing tapes to the web over the slots to form a continuous reenforcement over the edges of the slots, and subjecting the assembly to further blank forming operations including severing and scoring the assembly and forming supplemental aligning slots through the assembly parallel with the first slots at points where they will align with the bases of the folded side walls to separate the end wings from the end folds.

13. The method of producing a cardboard box having double side walls, inturned end wings, and end folds straddling the end wings, which includes the steps of forming opposed aligning slots inwardly of the side edge portions of a web of cardboard at points where the cardboard is to be folded over to form the double side walls of the box, thereby to reduce the height of the end wings, applying reenforcing tapes to one face of the web over the slots to form a continuous reenforcement over the top edges of the end wings, applying cover material to the web and tapes, scoring the assembly longitudinally of the web to define the fold lines for the end folds of the box, forming supplemental aligning slots in the assembly parallel with the first slots at points where they will align with the bases of the folded side walls of the box to separate the end wings from the end folds, scoring the assembly transversely of the web in line with the slots, and severing the assembly at blank intervals.

CLARENCE LLOYD CLAFF.